United States Patent [19]

Riese

[11] Patent Number: 4,974,872
[45] Date of Patent: Dec. 4, 1990

[54] AXLE SUSPENSION WITH TWO AIR SPRINGS SUPPORTING A TELESCOPIC STRUT

[75] Inventor: Wolfgang Riese, Hombrechtikon, Switzerland

[73] Assignee: Zahnradfabrik Friedrichshafen AG, Friedrichshafen, Fed. Rep. of Germany

[21] Appl. No.: 340,133

[22] Filed: Apr. 18, 1989

[51] Int. Cl.⁵ .......................... B60G 3/06; B60G 15/12
[52] U.S. Cl. ...................... 280/693; 280/698
[58] Field of Search ............... 280/690, 691, 692, 693, 280/697, 698, 688; 188/18 R, 18 A

[56] References Cited

U.S. PATENT DOCUMENTS

| | | | |
|---|---|---|---|
| 2,971,772 | 2/1961 | Tantlinger et al. | 280/683 |
| 3,446,513 | 5/1969 | Weiertz | 188/18 A |
| 4,143,887 | 3/1979 | Williams et al. | 280/697 |

FOREIGN PATENT DOCUMENTS

| | | | |
|---|---|---|---|
| 2398628 | 2/1979 | France | 280/693 |
| 81/02999 | 10/1981 | PCT Int'l Appl. | 280/688 |
| 88/04249 | 6/1988 | PCT Int'l Appl. | 280/688 |
| 793821 | 1/1981 | U.S.S.R. | 280/693 |

Primary Examiner—Charles A. Marmor
Assistant Examiner—Karin Tyson
Attorney, Agent, or Firm—Bachman & LaPointe

[57] ABSTRACT

A steering or non steering axle for buses, trucks or other vehicles including an independent suspension including a pivoting bearing supporting a wheel. A telescopic strut is connected between the pivoting bearing and a wheel housing. Air spring bellows are provided on opposite sides of the strut and are supported between an air spring piston and an upper support. An absorption member is provided on the air spring piston to act when the bellows are fully compressed.

14 Claims, 7 Drawing Sheets

AXLE SUSPENSION WITH TWO AIR SPRINGS SUPPORTING A TELESCOPIC STRUT

The invention relates to a steering or non-steering axle for buses, in particular articulated buses, trucks and also trailers and semitrailers, military and special vehicles, having a rim with tires secured to the wheel hub or axle end in a wheel case housing and a braking system composed, for example, of brake disks, brake drums, calipers, braking rod holders or the like.

For buses or trucks or else trailers or semitrailers, military and special vehicles, nowadays the steering axles are either designed as rigid axles or some with double wishbone. Double wishbones are very complex and require considerable space.

The latter also applies to rigid axles, in this case an additional factor being a very high weight of the axle itself. This design of the steering axles makes it necessary for the entrance into buses to be set very high, so that as a rule additional steps are necessary. An entrance without steps is not possible.

The last-mentioned problem applies in particular to articulated buses, which are used in urban local traffic. In this case, these articulated buses usually have a front axle and a rear axle as well as a middle axle. While the rear wheels and the wheels of the middle axle are rigidly interconnected, the wheels of the front axle are usually individually suspended and intercoupled via a steering tie rod. This rigid connection of the wheels of the middle axle in particular has the disadvantage that the floor plate of the bus has to be positioned relatively high above the roadway surface, so that, as mentioned above, the entrance in such buses is made more difficult.

The inventor set himself the object of developing an axle of the above mentioned type which eliminates these disadvantages and, in particular, requires significantly less space between the two wheel suspensions, in order that, for example, the floor plate can be lowered.

Helping to achieve this object is the fact that the rigid brake parts, such as anchor plate, calipers, braking rod holders or the like are connected via a telescopic strut to the wheel case housing and via connecting means to, for example, a floor support.

This means that in this case the rigid connection of the wheels of the middle axle is dispensed with, so that the floor plate can be positioned at an only relatively small distance from the roadway.

In the preferred exemplary embodiment, the braking element or the like is to be secured to a pivoting bearing which consists of at least two legs for articulating the telescopic strut and the connecting means. With one leg, the connecting means are coupled, the latter consisting, for example, of two struts and forming a wishbone which is fixed to a floor support or the like. In order to ensure a cushioning of the wheel, the wishbone is to be connected to the pivoting bearing via a ball joint.

From the other leg of the pivoting bearing, the telescopic strut protrudes upwards toward the wheel case housing. It is at the same time connected fixedly to the pivoting bearing and articulatedly to the wheel case housing. It consists essentially of a telescopic strut guide tube and a telescopic strut piston rod. The telescopic strut piston rod slides in the telescopic strut guide tube and is mounted there in a way secure from twisting. The latter feature prevents a twisting between wheel and the air spring bellows support.

According to the invention, the telescopic strut guide tube is to have connected to it the air spring bellows support, on which there rests at least one air spring bellows, which on the other hand is supported with respect to the wheel case housing or a bellows support connected to the telescopic strut piston rod. This air suspension has considerable advantages over known telescopic struts composed of shock absorber and helical spring.

Above all, the filling of the air spring bellows can be controlled, so that, for example, the floor plate can also be additionally lowered.

Between air spring bellows and air spring bellows support there is intended to be an air spring piston, on which an absorption member rests. This absorption member acts in particular when the suspension is fully compressed.

In a further preferred exemplary embodiment, the telescopic strut piston rod is to be held in the telescopic strut bearing by a bearing. This bearing may, for example, be a tapered bearing. This makes it possible also to design the wheels of a middle axle as steerable, in which case the steering tie rod secured to the pivoting bearing serves as steering rod.

Since air suspension does not normally provide shock absorption, additional shock absorbers are also to be connected to the pivoting bearing on the one hand and to the wheel case housing on the other hand or to the upper bellows support. For this purpose, for example the pivoting bearing has lateral lobes, to which the shock absorbers can be secured, they then being taken between telescopic strut bellows and telescopic strut upwards to the wheel case or to the upper bellows support.

A further feature of the invention is the inclination of the longitudinal axis of the shock absorber at a certain angle to the longitudinal axis of the telescopic strut. The slanting of the telescopic strut usually produces a relatively high friction between telescopic strut piston rod and telescopic strut guide tube.

According to the present invention, a large part of the force upon compression is absorbed by the shock absorbers arranged at an angle to the telescopic strut, and thus the friction between telescopic strut guide tube and telescopic strut piston rod is minimized.

Such a single-wheel suspension is in one instance of fixed design, in which case the air spring bellows and shock absorbers can be connected to the wheel case housing. If, on the other hand, they are of swivel design, spring bellows and shock absorber are coupled to the above mentioned bellows support and the single-wheel suspension swivels in the telescopic strut bearing.

In a further exemplary embodiment of the invention, the axis of the shock absorber is to run approximately parallel to the axis of the telescopic strut. Furthermore, the axes of the shock absorbers are to be moved as far as possible toward the tires. This means that they have common points of articulation, as in the present case are the pivoting bearing on the one hand and the upper spring bellows support on the other hand. As a result, once again the spring deflection is improved and on the other hand both parts of the shock absorber which together effect the absorption are subject to low wear. The absorption is also improved in particular by the moving of the shock absorber closer to the tires. For a smoother response of the suspension, it is envisaged that the shock absorbers have double rubber bearings, firstly by means of flexible buffers with the upper spring bellows support and secondly via the telescopic strut bearing supported flexibly against the wheel case.

In order to accomplish a steerable design of an axle of the type concerned here with spring bellows, shock absorber and telescopic strut, it is necessary that shock absorber, air spring bellows and corresponding parts of the telescopic strut, such as, for example, in the present case the telescopic strut guide tube, can swivel jointly.

For the articulation of the shock absorbers, the pivoting bearing is to have on both sides of the axle end a bridge strip against which the shock absorbers are supported, while they are connected at the other end to the upper spring bellows support. The telescopic strut, again with a telescopic strut guide tube, is clasped in a clamping manner by an eye, this eye being formed on a neck part of the pivoting bearing. To produce the clamping hold, the eye has a longitudinal slit, through which corresponding clamping screws pass.

An essential part of the invention is that the pivoting bearing is designed mirror-symmetrically about an axis with respect to the articulation of the shock absorbers and of the steering tie rod. This means that a thus formed pivoting bearing is suitable both for left-axle and also right-axle installation. All that is necessary is to turn the pivoting bearing about its axis in order to achieve a follow-on, and then to make the corresponding bore for the steering tie rod joint.

The axle preferably also splits mirror-symmetrically the eye and the neck part as well as the stepped bore for the axle end. A mass production of the pivoting bearing is thereby ensured.

The fixed parts of the braking system, such as, for example, braking rod holders, are fixed to the pivoting bearing itself. For this purpose as well, this pivoting bearing then has corresponding bores for the fixing of these braking rod holders. This design of the pivoting bearing makes a versatile use of such an axle possible, above all for steerable and non-steerable axles. In such cases, the pivoting bearing may, for the sake of simplicity, consist of a one-piece casting or forging.

Further advantages, features and details of the invention emerge from the following description of preferred exemplary embodiments and with reference to the drawing, in which.

Figure 1:
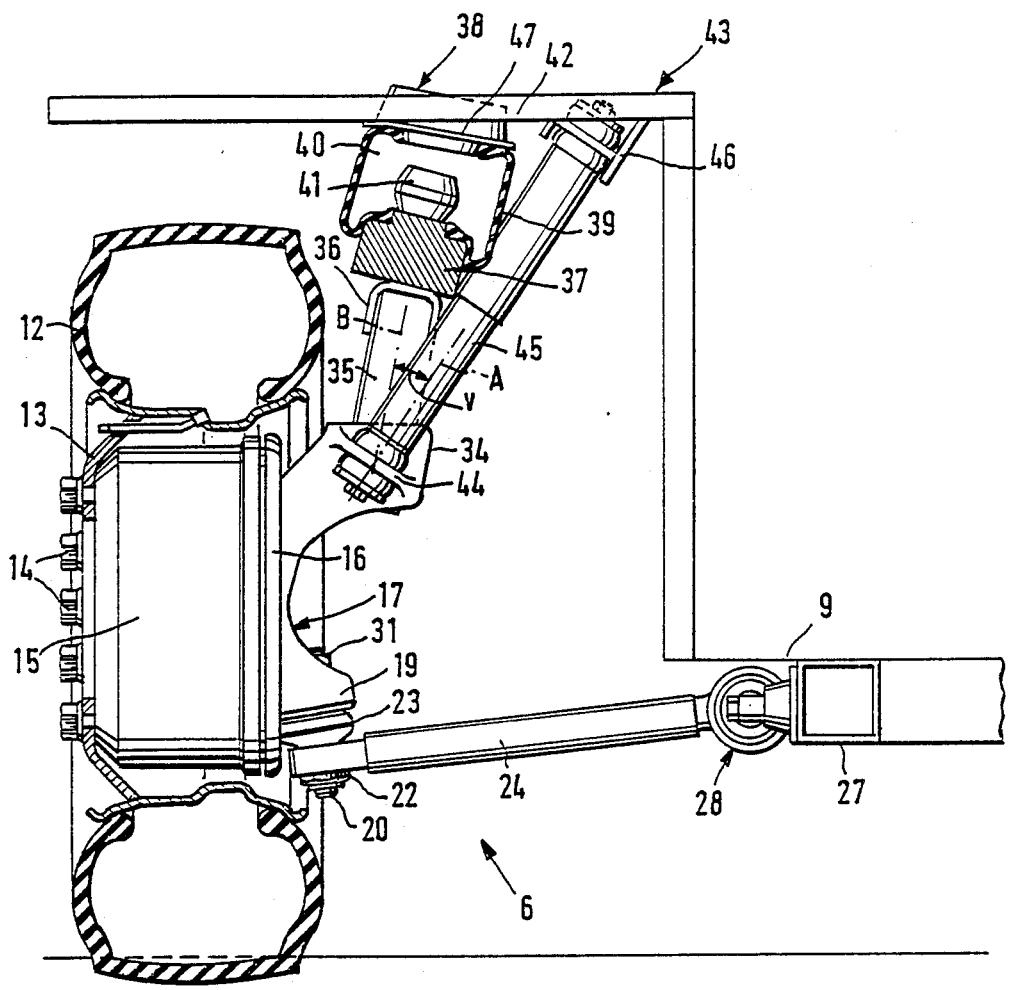
FIG. 1 shows a partially sectioned view of a wheel case region, seen in the direction of travel.

In FIG. 1, part of an axle 6 and a floor plate 9 of a motor vehicle are shown. This is a single-wheel suspension here. The corresponding tires 12 are held by a rim 13, which is connected via screws 14 to a brake drum 15. The brake drum 15 is pushed onto a static anchor plate 16. The anchor plate 16 is fixedly connected to a pivoting bearing 17. In the pivoting bearing 17 there runs a wheel hub 18, shown in FIG. 2.

The pivoting bearing 17 has three legs. A lower leg 19 has a swivel pin 20 passing through it, which is fitted with a nut 22. The lower leg 19 is abutted on the underside by a ball joint 23, which in the embodiment shown is surrounded by a rubber sleeve. Two struts 24 and 26 of a wishbone 25 (see FIG. 2) extend from between ball joint 23 and nut 22. Strut 24 and strut 26 of the wishbone 25 each form a moving joint 28 with a floor support 27 fixed to the floor plate 9.

Figure 2:
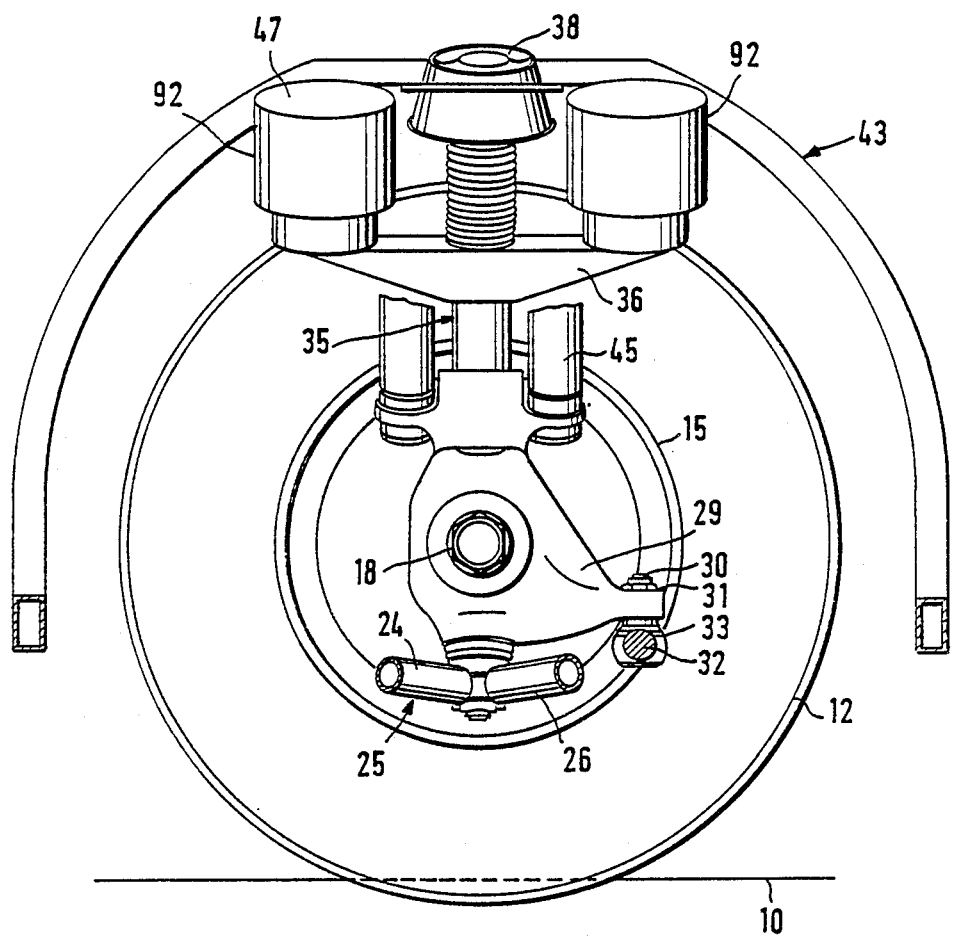
FIG. 2 shows partially sectioned view of the zone according to FIG. 1, seen from the longitudinal axis.

The middle leg 29, shown in FIG. 2, also has a swivel pin 30 passing through it, which is secured by a nut 31. This swivel pin 30 is connected to a steering tie rod 32, here too a swivel joint being surrounded by a sleeve 33.

Connected to the upper leg 34 of the pivoting bearing 17 is a telescopic strut 35, on which at least one air spring piston 37 a lower stop rests via an air spring bellows support 36.

Between the air spring piston 37 and a telescopic strut bearing 38 there is an airtight space 40 enclosed by an air spring bellows 39, in which space an absorption member 41 is fitted on the air spring piston 37.

The telescopic strut bearing 38 is fixed to the wheel case housing 43 via corresponding connecting plates 42.

On both sides of the upper leg 34 there extend from the latter lobes 44, to which shock absorbers 45 are secured. At the other end, each shock absorber 45 is connected via a securing frame 46 to the wheel case housing 43. The longitudinal axis A of the shock absorber 45 forms an angle v with the longitudinal axis B of the telescopic strut 35, the function of which is described further below.

Figure 3:
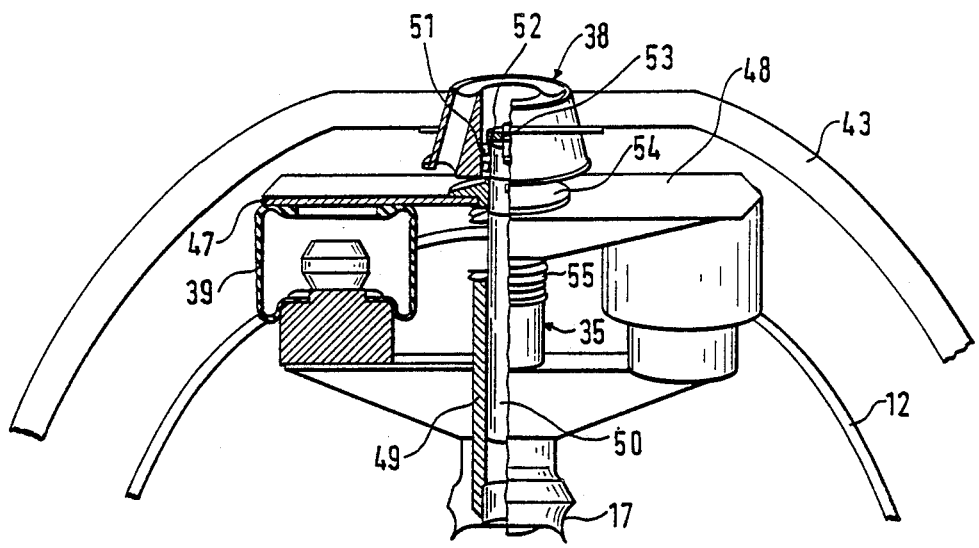
FIG. 3 shows a partially sectioned view of a part of the region corresponding to FIG. 2, in a different embodiment.
Figure 4:
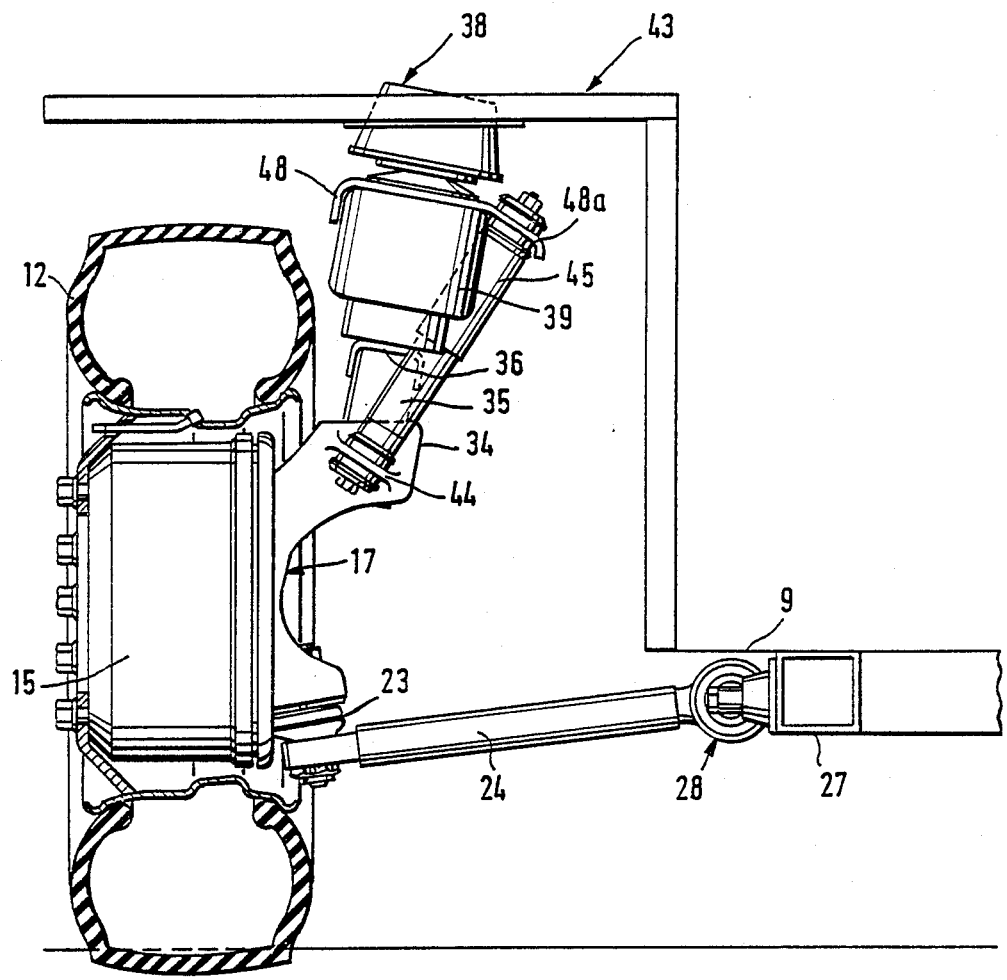
FIG. 4 shows a view of a different embodiment of a wheel case region corresponding to FIG. 1.

In FIG. 2 it is shown that an air spring bellows 39 a compression absorbing means, is provided on each of both sides of the telescopic strut 35, which bellows is supported on the one hand on the air spring bellows support 36 and on the other hand via a stop plate 47 against the wheel case housing 43. This support is altered in FIG. 3 by the fact that the spring bellows 39, or their stop plates 47, are borne by a bellows support 48, which is connected underneath the telescopic strut bearing 38 to the telescopic strut 35. In the case of the swiveling single suspension according to FIG. 4, the shock absorber 45 is supported against the bellows support 48 or an angled-off part 48a thereof.

The telescopic strut 35 consists of a telescopic strut guide tube 49, which is secured to the pivoting bearing 17. In the telescopic strut guide tube 49 there slides a telescopic strut piston rod 50, which passes through the bellows support 48 and engages in the telescopic strut bearing 38. Here, a tapered bearing 52 is provided for an inner telescopic strut bearing 51.

Similarly, corresponding securing means 53 for the telescopic strut piston rod 50 are indicated.

In the region between the telescopic strut bearing 38 and the bellows support 48 and after this bellows support 48, rubber sleeves 54 and 55 take over the sealing of the telescopic strut guide tube 49 with respect to the telescopic strut piston rod 50. It is also conceivable that, instead of the rubber sleeve 55, an additional air spring bellows may be arranged, which takes over the sealing between telescopic strut guide tube and telescopic strut piston rod and at the same time shares in the supporting function by compressed air actuation.

The angle v between the longitudinal axis A of the shock absorbers and the longitudinal axis B of the telescopic strut 35 has the effect that a part of the shock absorber force leads to relief of the friction occurring between telescopic strut guide tube 49 and telescopic strut piston rod 50. Consequently, a smoother response of the suspension is achieved.

Since, in a preferred exemplary embodiment, the complete telescopic strut is to be arranged in a swiveling manner in the tapered bearing 52 with the air spring bellows 39 connected to it and the shock absorbers connected to the bellows support 48, the telescopic strut piston rod 50 must be restrained in the telescopic strut guide tube 49 such that a relative rotational movement of the two elements with respect to each other is impossible. This can be performed, for example, by a toothing, not shown in more detail, the telescopic strut guide tube having an internal toothing running along its longitudinal axis and the telescopic strut piston rod 50 having a corresponding external toothing. A relative rotation is also prevented, however, by a rolling element, not shown in more detail, which moves in a track, or by some other geometrical body which is provided between telescopic strut piston rod 50 and telescopic strut guide tube 49.

Figure 5:
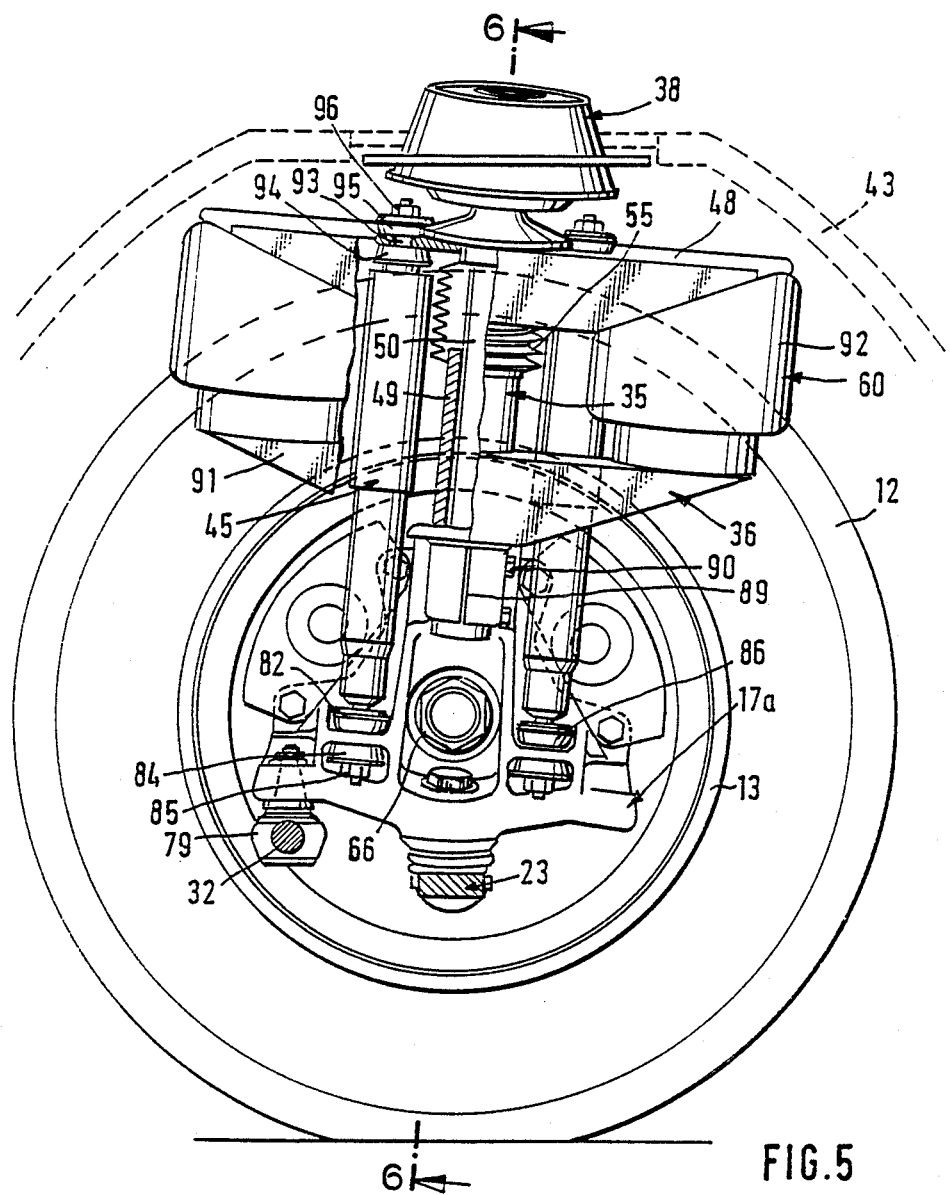
FIG. 5 shows a view of a further embodiment of a motor vehicle with corresponding axle parts, a suspension, braking position (sic) and wheel.

According to FIG. 5, a suspension 60 is connected via a telescopic strut bearing 38 to a wheel case housing 43. At the other end there are connections between suspension 60 and a pivoting bearing 17a, to which the steering tie rod 32 and the joint 23 for the wishbones 25, 26 is fixed. Furthermore, on this pivoting bearing 17a there are also corresponding parts of a braking system (see FIG. 6), to which in turn a rim 13 is fixed as holder for corresponding tires 12.

The centerpiece of this entire arrangement is the pivoting bearing 17a. This has firstly a stepped bore 61 passing through it, which receives the rotating axle end 18, which is supported via corresponding bearings 62 and 63 against the stepped bore 61. The stepped bore 61 is sealed off from the outside via corresponding seals 64 and 65, so that a lubricant in the stepped bore 61 cannot escape. The axle end 18 is fixed by a corresponding nut 66.

The axle end 18 is adjoined by a flange support 67, to which the rim 13 is fixed via screw bolts 68. The flange support 67 is connected by further screw bolts 69 to a brake disk support 70, which runs around a cylindrical section 71 forming the stepped bore 61 and is adjoined by a brake disk 72. This brake disk 72 is surrounded by braking rod holders 73, parts of brake pads 74 also being shown in FIG. 6. The braking rod holders 73 are connected via corresponding screw bolts 75 to the pivoting bearing 17a, corresponding bores 76 being provided for these screw bolts 75 on the pivoting bearing 4 (see FIG. 7).

The pivoting bearing 17a has, moreover, an axis of symmetry C. With the exception of a bore 77 for the joint 23, the parts of the pivoting bearing 17a are designed mirror-symmetrically to the left and right of the axis of symmetry C. This applies above all to the conical bores 78, which are used for fixing the steering tie rod joint 79. The same also applies to a bridge strip 80, which has a securing eye 81 passing through it, which has inserted through it a securing bolt 82 of the shock absorber 45 when in the position for use. Below this bridge strip 80 there is formed in the pivoting bearing 17a an opening 83, which is used for receiving a flexible buffer 84 and a nut 85 for fixing the securing bolt 82. The shock absorber 45 is supported on the bridge strip 80 against flexible buffer 86.

The mirror-symmetrical arrangement of this pivoting bearing 17a, and of the individual securing positions, has the advantage that the pivoting bearing 17a can be used left-axle and also right-axle. Therefore, with the exception of the bore 77, the pivoting bearing 17a can be mass produced. This bore 77 for the joint 23 must have a predetermined inclination at an angle w with respect to the axis of symmetry C. Therefore, it is made subsequently, depending on whether the pivoting bearing 17a is to be used left-axle or right-axle.

Along the axis of symmetry C there extends from the cylindrical section 31 of the pivoting bearing 17a a neck part 87, onto which an eye 88 is formed. This eye 88 embraces the telescopic strut 35 or the telescopic strut guide tube 49.

To fix the telescopic strut guide tube 49, the eye 88 has a slit 89, which has two clamping screws 90 crossing through it.

Supported against the eye 88 and the neck part 87 is the lower air spring bellows support 36, which surrounds the telescopic strut guide tube 49, forming carrying arms 91 on both sides. The air springs 92, which are supported against an upper air spring bellows support 48, are fitted on these carrying arms 91. This upper air spring bellows support 48 surrounds the telescopic strut 35 in the shape of a U and serves at the same time as upper point of articulation for the shock absorbers 45. In this arrangement the shock absorbers 45 in turn pass through with a securing bolt 93 the upper spring bellows support 48, the shock absorbers being mounted on both sides via flexible buffers 94 and 95.

A nut 96 holds the securing bolt 93. In this arrangement, the axis A of the shock absorber 35 (sic) runs approximately parallel to the axis B of the telescopic strut 35.

In the telescopic strut guide tube 49, a telescopic strut piston rod 50 is guided, a corresponding membrane bellows 55 being provided. This telescopic strut piston rod 50 engages in the telescopic strut bearing 38 and is guided there in a double ball bearing 51.

The membrane bellows 51 may, moreover, also or only be replaced by a separate air spring bellows, so that a different load-bearing capacity is achieved.

Figure 6:
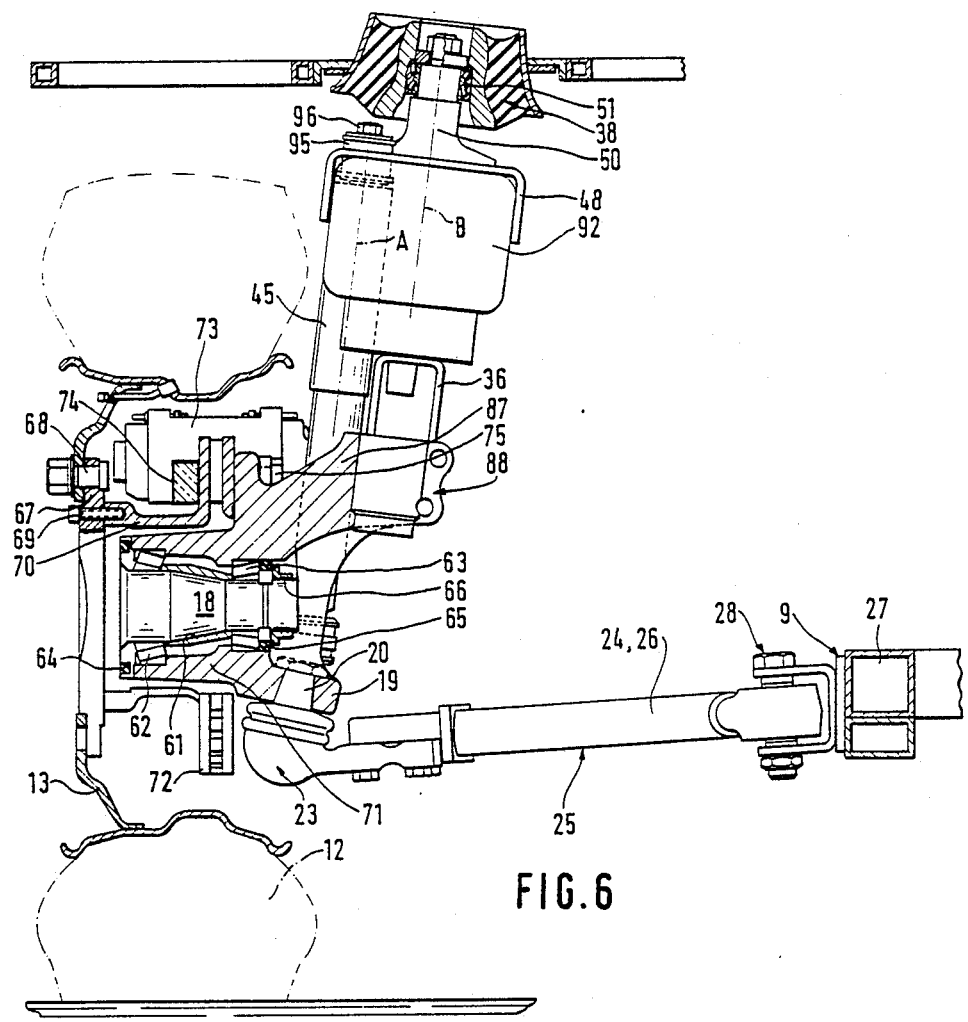
FIG. 6 shows a partially represented cross-section through FIG. 5 along line VI—VI.
Figure 7:
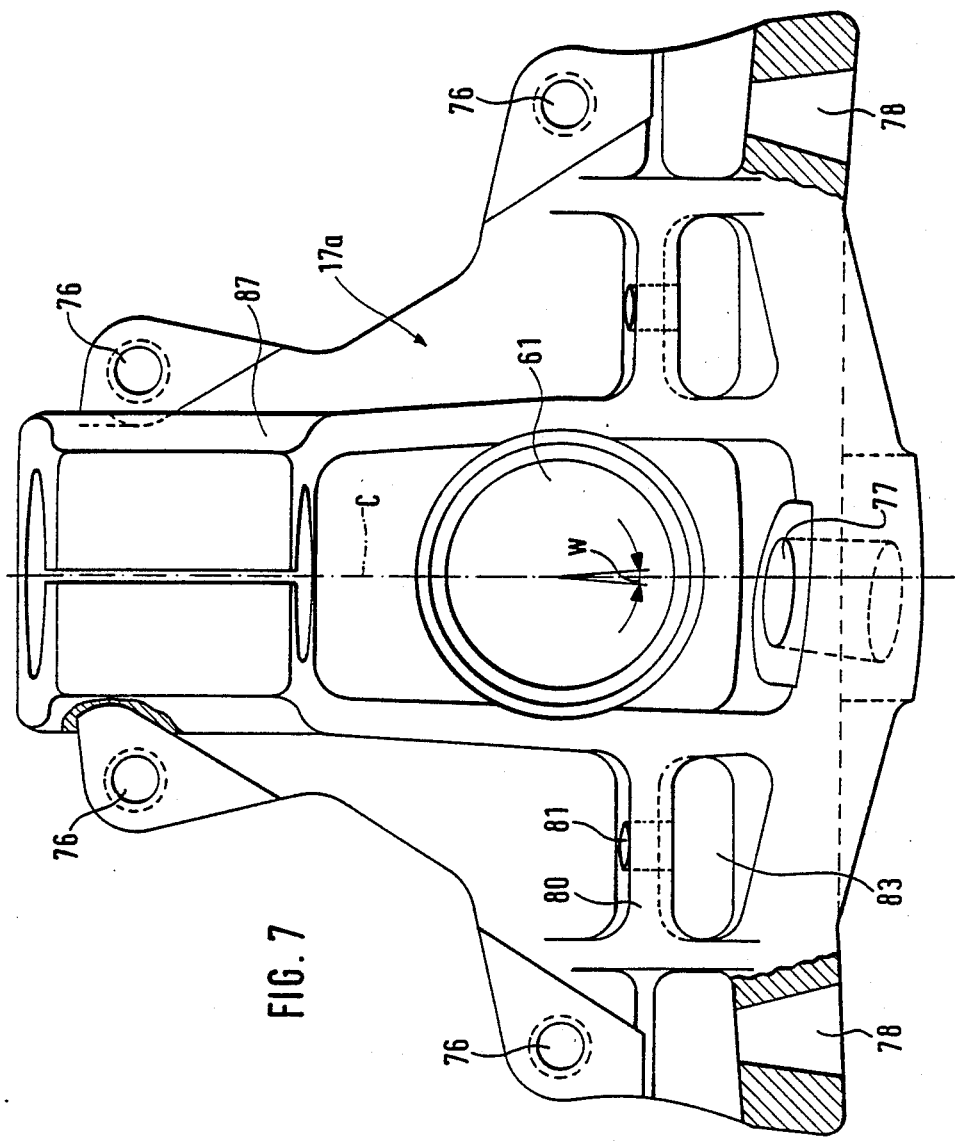
FIG. 7 shows a pivoting bearing on enlarged scale.

Also indicated, moreover, in FIG. 6 is the articulation of the wishbone 24/26 via the corresponding joint 28 to the floor plate 9.

I claim:

1. An automotive vehicle having an axle, a wheel connected to the axle, braking means associated with the wheel, a wheel case housing and a floor support, a pivoting bearing, a telescopic strut having a longitudinal axis connecting the brake means to the wheel case housing and strut means for connecting the brake means to the floor support, the improvement which comprises: said telescopic strut having a guide tube connected to said pivoting bearing; a piston rod reciprocally mounted in said guide tube and having one end connected to said wheel case housing; and energy absorbing means connecting said guide tube to said piston rod, said energy absorbing means include (1) an upper support connected to said piston rod and extending in a plane substantially perpendicular to the longitudinal axis of the telescopic strut on opposed sides thereof thereby defining first and second stops, (2) a lower support connected to said guide tube and extending in a plane substantially perpendicular to the longitudinal axis of the telescopic strut on opposed sides thereof thereby defining third and fourth stops, and (3) first and second compression absorbing means disposed between said first and third and said second and fourth stops, respectively.

2. An automotive vehicle according to claim 1 wherein the brake means is secured to the pivoting bearing said pivoting bearing comprising at least two legs for articulating the telescopic strut and the strut means.

3. An automotive vehicle according to claim 2 wherein the strut means comprises two struts in the shape of a wishbone, which is articulatedly connected on the one hand to one leg via a ball joint through which a swivel pin passes and on the other hand to the floor support.

4. An automotive vehicle according to claim 1 wherein the piston rod of the telescopic strut is connected via a strut bearing to the wheel case housing.

5. An automotive vehicle according to claim 1 wherein the piston rod is mounted in the guide tube in a non-twisting manner.

6. An automotive vehicle according to claim 1 wherein each of the first and second compression absorbing means comprise an air spring bellows.

7. An automotive vehicle according to claim 4 wherein the piston rod is held in the strut bearing by a tapered bearing.

8. An automotive vehicle according to claim 2 wherein the pivoting bearing is connected to a further leg for articulated connection to a steering tie rod.

9. An automotive vehicle according to claim 8 wherein the pivoting bearing is connected to at least one shock absorber which is secured to the wheel case housing.

10. An automotive vehicle according to claim 8 wherein a pair of lobes extend from the leg on both sides thereof for the securing of shock absorbers.

11. An automotive vehicle according to claim 8 wherein the longitudinal axis of the shock absorber forms an angle (v) with the longitudinal axis of the telescopic strut.

12. An automotive vehicle according to claim 8 wherein the shock absorber is supported by means of flexible buffers to the upper support and the latter is supported by means of the telescopic strut with the telescopic strut bearing supported flexibly against the wheel case.

13. An automotive vehicle according to claim 12 wherein the pivoting bearing has fixed on it a bridge strip with securing eyes against which the shock absorber is supported, while it is connected at the other end to the upper support.

14. An automotive vehicle according to claim 13 wherein the pivoting bearing is designed mirror-symmetrically about an axis with respect to the articulation of the shock absorbers and of the steering tie rod.

* * * * *